US012763235B2

(12) United States Patent
Shinozawa et al.

(10) Patent No.: US 12,763,235 B2
(45) Date of Patent: Oct. 13, 2026

(54) ELECTRONIC COMPONENT AND CHIP VARISTOR

(71) Applicant: TDK Corporation, Tokyo (JP)

(72) Inventors: Koki Shinozawa, Tokyo (JP); Masayuki Uchida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 503 days.

(21) Appl. No.: 18/537,243

(22) Filed: Dec. 12, 2023

(65) Prior Publication Data

US 2024/0242861 A1 Jul. 18, 2024

(30) Foreign Application Priority Data

Jan. 17, 2023 (JP) ................................ 2023-005396

(51) Int. Cl.
*H01C 7/102* (2006.01)
*H01C 1/142* (2006.01)

(52) U.S. Cl.
CPC ............. *H01C 7/102* (2013.01); *H01C 1/142* (2013.01)

(58) Field of Classification Search
CPC ................................ H01C 7/102; H01C 1/142
See application file for complete search history.

(56) References Cited

U.S. PATENT DOCUMENTS 5,793,601 A * 8/1998 Nakamura ............ H01F 1/0027 361/321.5
9,715,967 B2 * 7/2017 Adachi ................ H01G 4/0085
10,283,269 B2 * 5/2019 Fujii ...................... H01G 4/232
2015/0115893 A1 4/2015 Lee et al.
2018/0082792 A1 * 3/2018 Satoh ..................... H01G 4/232
2024/0242861 A1 * 7/2024 Shinozawa ............ H01C 1/142

FOREIGN PATENT DOCUMENTS

JP 2007-251010 A 9/2007
JP 2015-084399 A 4/2015
JP 2017-204547 A 11/2017
JP 2018-067562 A 4/2018
JP 2020-096075 A 6/2020

OTHER PUBLICATIONS

May 12, 2026 Office Action issued in Japanese Patent Application No. 2023-005396.

* cited by examiner

*Primary Examiner* — Kyung S Lee
(74) *Attorney, Agent, or Firm* — Oliff PLC

(57) ABSTRACT

In the chip varistor, the protruding lengths of the second portions of the first and second electrodes are shorter than the protruding lengths of the first portions of the third electrodes. Since the protruding lengths of the second portions are relatively short, distances between the first electrodes and the second electrodes on the side surfaces are secured, thereby suppressing short-circuiting. On the other hand, by making the protruding length of the first portion of the third electrode relatively long, the first portion becomes wide, the covering property of each end portion of the third conductor exposed on the side surface on which the third electrode is provided is enhanced, and the connectivity between the third conductor and the third electrode is improved.

5 Claims, 9 Drawing Sheets

ELECTRONIC COMPONENT AND CHIP VARISTOR

CROSS-REFERENCE TO RELATED APPLICATIONS

This application is based upon and claims the benefit of priority from Japanese Patent Application No. 2023-5396, filed on 17 Jan. 2023, the entire content of which is incorporated herein by reference.

TECHNICAL FIELD

The present disclosure relates to an electronic component and a chip varistor.

BACKGROUND

Well known in the art is a capacitor (Japanese Patent Application Publication No. 2015-84399) and a chip varistor (Japanese Patent Application Publication No. 2017-204547) as electronic components having a configuration in which end surface electrodes are provided on a pair of end surfaces of an element body and side surface electrodes are provided on a pair of side surfaces.

SUMMARY

In the electronic component having the above-described configuration, demand for reduction in size and height is increasing along with reduction in size of the electronic device. When the end surface electrodes come close to each other as the electronic component is reduced in size and height, a risk of a short circuit between the end surface electrodes or a variation in component characteristics is likely to occur. Therefore, it is necessary to secure a sufficient distance between the end surface electrodes. On the other hand, in the case that the side surface electrode provided on the side surface of the element body cannot be sufficiently secured, the covering property of the internal electrode extracted to the side surface deteriorates.

As a result, the inventors have newly found a technique capable of enhancing the covering property of the side surface electrode while securing the distance between the end surface electrodes.

The present disclosure provides an electronic component and a chip varistor improving the coverage of a side surface electrode while securing a distance between end surface electrodes.

An electronic component according to one embodiment of the present disclosure includes, an element body including a pair of main surfaces parallel to each other and one of pair of main surfaces constitutes a mounting surface, a pair of end surfaces parallel to each other and extending in a direction intersecting the main surfaces, and a pair of side surfaces parallel to each other and extending in a direction intersecting the main surfaces and the end surfaces, a side surface exposed electrode provided in the element body and having an end portion exposed at the side surface, the end portion extending in parallel to the main surface at the side surface, a pair of end surface electrodes respectively provided on the pair of end surfaces, each of the end surface electrodes integrally covering the end surface, the side surfaces and the main surfaces of portions close to the end surface, and each of the end surface electrodes having a first portion covering the end surface, a second portion covering the side surface, and a third portion covering the main surface, and a side surface electrode provided on the side surface, integrally covering the side surface and the main surface of a portion close to the side surface, the side surface electrode having a first portion covering the side surface and connected to the end portion of the side surface exposed electrode exposed on the side surface, and a second portion covering the main surface, wherein a protruding length of the second portion of the end surface electrode based on a virtual line connecting tip positions of the end surface electrodes on a ridge line defined by the main surface and the side surface of the element body is shorter than a protruding length of the first portion of the side surface electrode based on a virtual line connecting end positions of the side surface electrodes on the ridge line.

In the above-described electronic component, since the protruding length of the second portion of the end surface electrode is relatively short, the distance between the end surface electrodes are secured, thereby suppressing short circuit and the like. On the other hand, since the protruding length of the first portion of the side surface electrode is relatively long, the covering property of the side surface exposed electrode exposed to the side surface are enhanced.

In the electronic component according to another aspect, an angle of a tip of the side surface electrode in a cross section orthogonal to the side surface is narrower than an angle of a tip of the second portion of the end surface electrode in the cross section orthogonal to the side surface.

In the electronic component according to another aspect, a protruding length of a portion of the side surface electrode covering the main surface based on ridge lines defined by the main surfaces and the side surface of the element body is longer than a protruding length of the side surface electrode based on a virtual line connecting end positions of the side surface electrode on the ridge lines.

In the electronic component according to another aspect, a projection length of the third portion based on a virtual line connecting tip positions of the end surface electrode on ridge lines defined by the main surface and the side surfaces of the element body is longer than a projection length of a portion covering the main surface of the side surface electrode based on the ridge line.

A tip varistor according to one embodiment of the present disclosure is the above electronic component, and a varistor structure is formed inside the element body.

DETAILED DESCRIPTION

Figure 1:
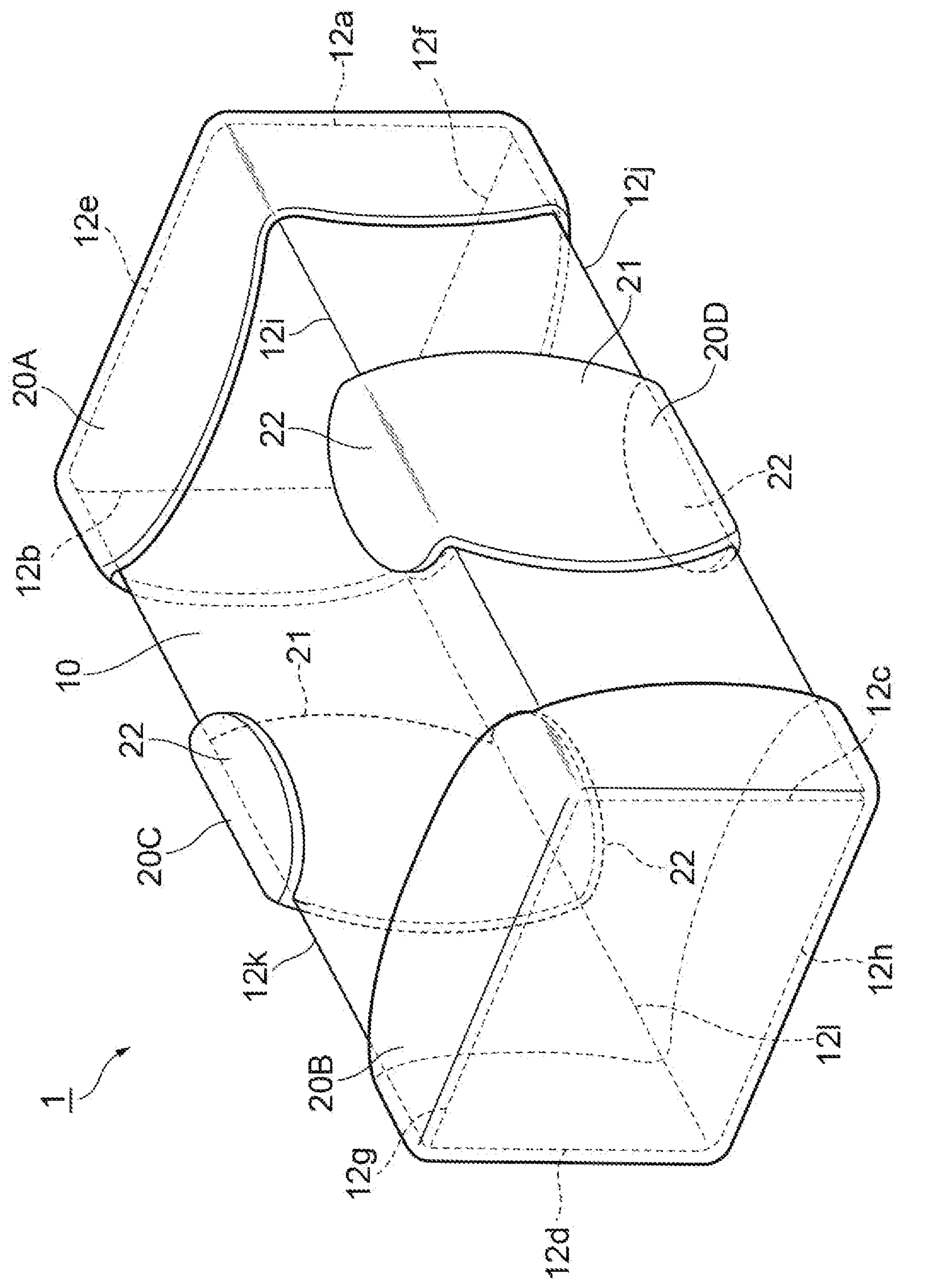
FIG. 1 is a schematic perspective view showing an electronic component according to one embodiment.

Hereinafter, embodiments of the present disclosure will be described in detail with reference to the accompanying drawings. In the description, the same reference numerals are used for the same elements or elements having the same functions, and redundant description will be omitted.

Figure 2:
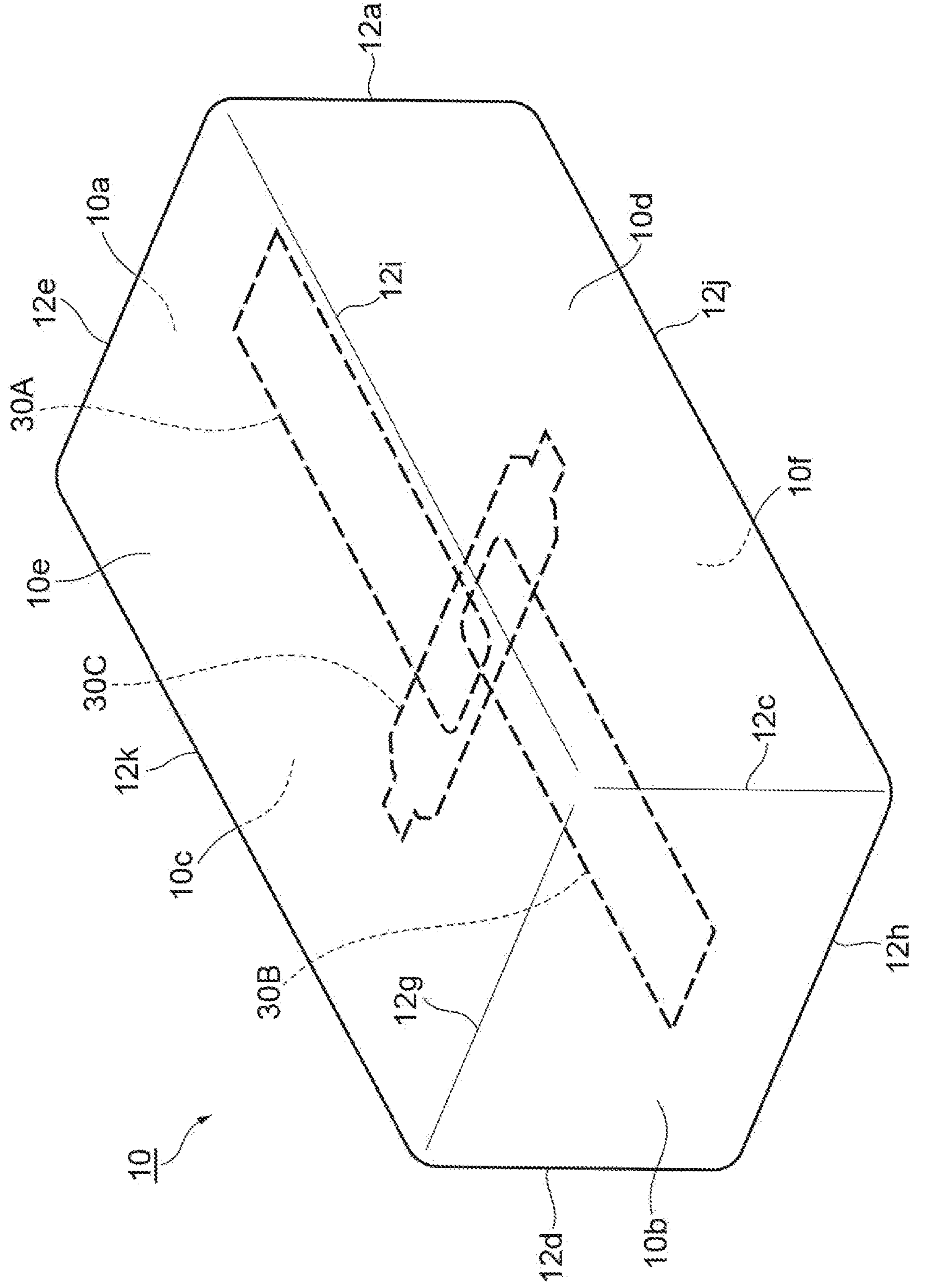
FIG. 2 is a perspective view showing each conductor inside the element body shown in FIG. 1.

A chip varistor as one type of electronic component will be described with reference to FIGS. 1 to 3.

The chip varistor 1 is a multi-terminal multilayer chip varistor, and includes an element body 10 and four terminal electrodes 20A to 20D. The chip varistor 1 has a substantially rectangular parallelepiped outer shape, and has a so-called 2012 size (2.0 mm in the longitudinal direction, 1.25 mm in the lateral direction, and 0.8 mm in height).

The element body 10 is a laminated structure having a substantially rectangular parallelepiped outer shape. The element body 10 includes a pair of rectangular end surfaces 10*a* and 10*b* that face each other in the longitudinal direction, a pair of rectangular side surfaces 10*c* and 10*d* that are orthogonal to the end surfaces 10*a* and 10*b*, and a pair of rectangular main surfaces 10*e* and 10*f*. The pair of side surfaces 10*c* and 10*d* and the pair of main surfaces 10*e* and 10*f* extend so as to connect the end surfaces 10*a* and 10*b*.

The pair of end surfaces 10*a* and 10*b* extend parallel to the lamination direction of the element body 10 and are parallel to each other. The pair of side surfaces 10*c* and 10*d* extend parallel to the lamination direction of the element body 10, are parallel to each other, and face each other in the lateral direction. The pair of main surfaces 10*e* and 10*f* extend so as to be orthogonal to the lamination direction of the element body 10, are parallel to each other, and face each other in the lamination direction of the element body 10. In the present embodiment, one main surface 10*f* constitutes a mounting surface facing a substrate on which the chip varistor 1 is mounted.

The element body 10 has twelve ridge lines 12*a* to 12*l* defined by adjacent surfaces 10*a* to 10*f*. Specifically, the element body 10 has four ridge lines 12*a* to 12*d* defined by each of the end surfaces 10*a* and 10*b* and each of the side surfaces 10*c* and 10*d*, four ridge lines 12*e* to 12*h* defined by each of the end surfaces 10*a* and 10*b* and each of the respective main surfaces 10*e* and 10*f*, and four ridge lines 12*i* to 12*l* defined by each of the side surfaces 10*c* and 10*d* and each of the surfaces 10*e* and 10*f*.

The element body 10 is made of a sintered body (semiconductor ceramic) that exhibits varistor characteristics. The element body 10 is a laminated structure composed of a plurality of layers composed of sintered bodies exhibiting varistor characteristics. In the actual element body 10, the constituent layers are integrated to such an extent that the boundaries therebetween cannot be visually recognized. The element body 10 contains ZnO (zinc oxide) as a main component, and contains elemental metals such as Co, rare earth metal elements, IIIb group elements (B, Al, Ga, In), Si, Cr, Mo, alkali metal elements (K, Rb, Cs), or alkaline earth metal elements (Mg, Ca, Sr, Ba), or oxides thereof as accessory components. In the case that the surface of the element body 10 is formed of glass, the surface of the element body 10 has high wettability. In the present embodiment, the element body 10 contains Co, Pr, Cr, Ca, K, and Al as accessory components. The content of ZnO in the element body 10 is not particularly limited, but is usually 99.8 to 69.0 mass % when the total material constituting the element body 10 is 100 mass %. The rare earth metal element (for example, Pr) acts as a substance that exhibits varistor characteristics. The content of rare earth metal elements in the element body 10 is set to, for example, about 0.01 to 10 atom %.

The chip varistor 1 includes a plurality of conductors in the element body 10. In the present embodiment, the chip varistor 1 includes a first conductor 30A, a second conductor 30B, and a third conductor 30C. The first conductor 30A, the second conductor 30B, and the third conductor 30C include a conductive material. The conductive material included in each of the conductors 30A, 30B, and 30C is not particularly limited, but Pd or Ag-Pd alloy may be employed. The thicknesses (lengths in the lamination direction) of the conductors 30A, 30B, and 30C are, for example, about 0.1 to 10 μm.

The first conductor 30A has a belt-like shape having a uniform width, and extends along the facing direction of the end surfaces 10*a* and 10*b* in an interlayer of layers constituting the element body 10. One end portion 30*a* of the first conductor 30A is exposed to the end surface 10*a*, and the other end portion 30*b* is located in the element body 10. The width of the first conductor 30A is, for example, 0.4 mm.

The second conductor 30B has a belt-like shape having a uniform width, and extends along the facing direction of the end surfaces 10*a* and 10*b* in a inter layer different from the interlayer in which the first conductor 30A is formed. One end portion 30*a* of the second conductor 30B is exposed to the end surface 10*b*, and the other end portion 30*b* is located in the element body 10. The second conductor 30B is designed to be as wide as the first conductor 30A, for example, 0.4 mm.

Figure 3:
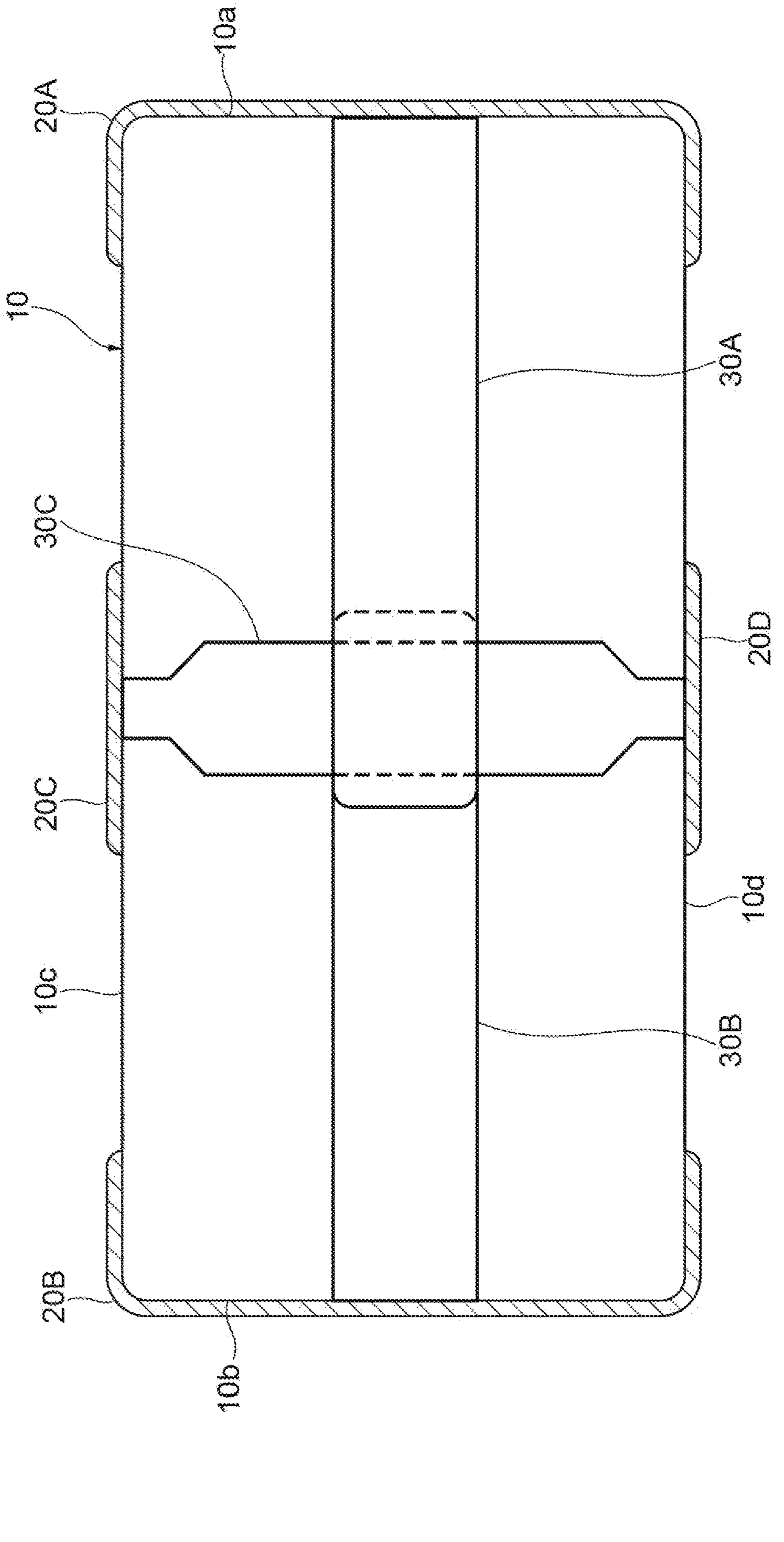
FIG. 3 is a cross-sectional view showing each conductor inside the element body shown in FIG. 1.
Figure 4:
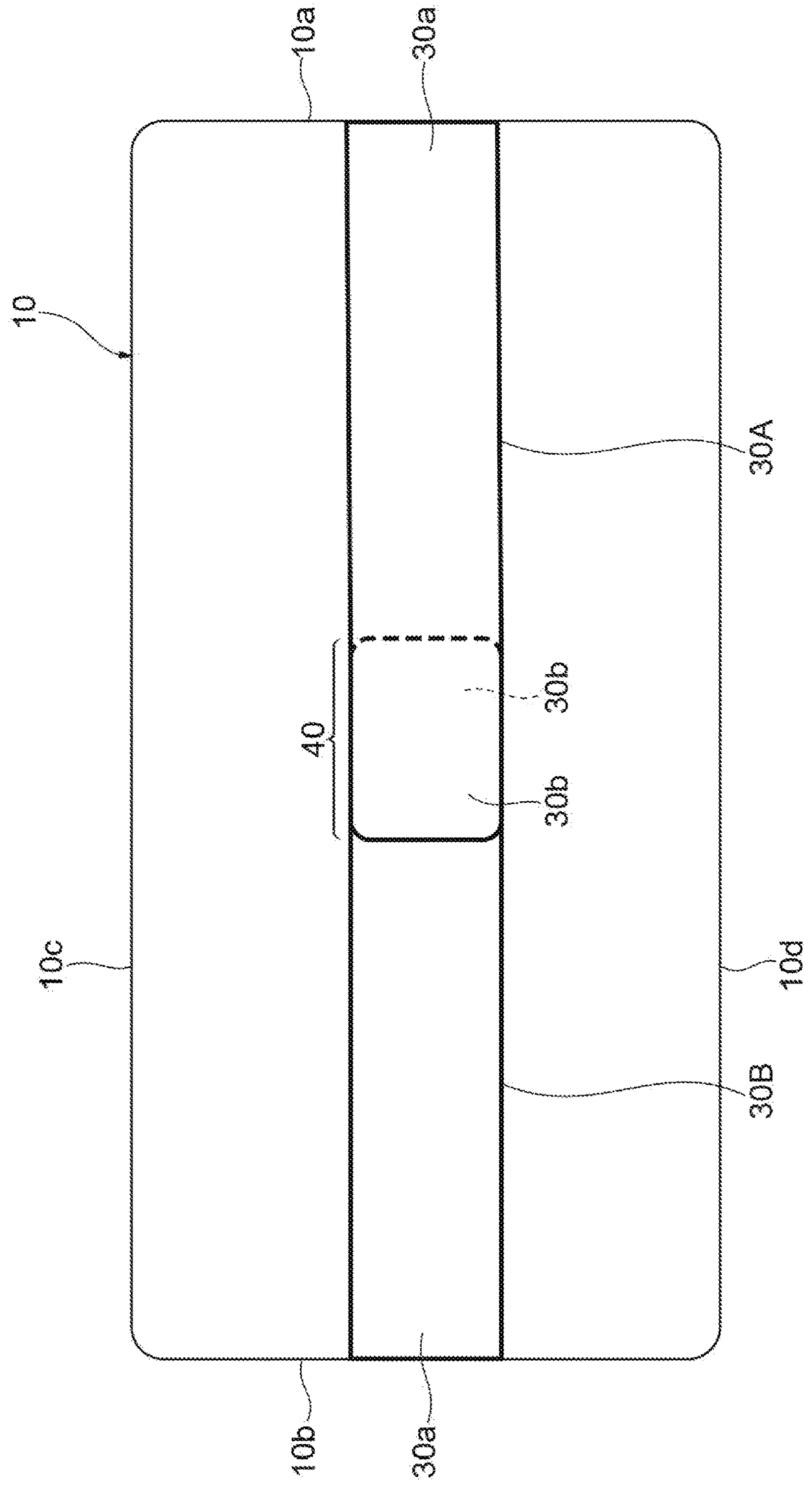
FIG. 4 shows only the first conductor and the second conductor.

As shown in FIGS. 3 and 4, the first conductor 30A and the second conductor 30B are aligned with each other when viewed from the lamination direction of the element body 10, and the end portions 30*b* located in the element body 10 completely overlap each other in the lamination direction. The overlapping portion 40 formed by overlapping the end portion 30*b* of the first conductor 30A and the end portion 30*b* of the second conductor 30B has a rectangular shape in which the long side direction is parallel to the facing direction of the end surfaces 10*a* and 10*b* when viewed from the lamination direction.

Figure 5:
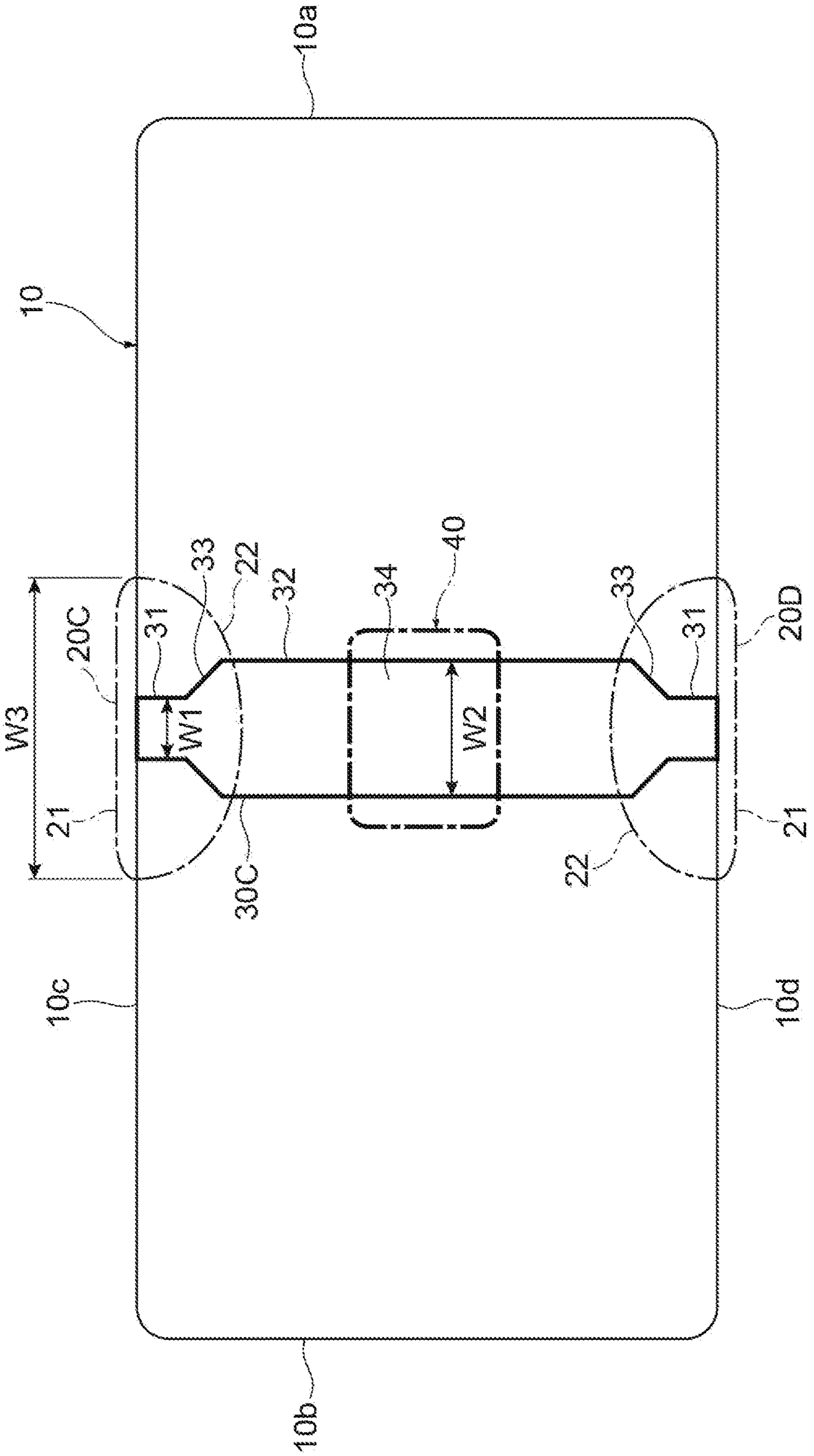
FIG. 5 shows a positional relationship between the third conductor and the third electrode.

The third conductor 30C (side surface exposed electrode) has a shape extending along the facing direction of the side surfaces 10*c* and 10*d*, and extends from the side surface 10*c* to the side surface 10*d*. As shown in FIG. 5, the third conductor 30C has a pair of end portions 31, a body portion 32, and a pair of widening portions 33.

Each end portion 31 of the third conductor 30C is located in the vicinity of the side surfaces 10*c* and 10*d* and is exposed from the side surfaces 10*c* and 10*d*. The shape (end surface shape) of each of the end portions 31 exposed from the side surfaces 10*c* and 10*d* is a shape extending in parallel to the main surfaces 10*e* and 10*f* (that is, in the facing direction of the end surfaces 10*a* and 10*b*) in the side surfaces 10*c* and 10*d*. Each end portion 31 has a uniform width W1 (length in the facing direction of the end surfaces 10*a* and 10*b*), and the width W1 is, for example, 0.1 mm.

The body portion 32 of the third conductor 30C is located at the center of the third conductor 30C between the both end portions 31, and intersects (in the present embodiment, is orthogonal to) the first conductor 30A and the second conductor 30B. The body portion 32 includes a functional portion 34 that is a portion overlapping the overlapping portion 40 of the first conductor 30A and the second conductor 30B in the lamination direction of the element body 10. The third conductor 30C overlaps with the first conductor 30A only in the overlapping portion 40, and overlaps with the second conductor 30B only in the overlapping portion 40. Therefore, the area of the functional portions 34 coincides with the overlapping area of the third conductor 30C and the first conductor 30A and also coincides with the overlapping area of the third conductor 30C and the second conductor 30B. The body portion 32 has a uniform width W2, and the width W2 of the body portion 32 is designed to be wider than the width W1 of the end portion 31 (W2>W1). The width W2 of the body portion 32 is, for example, 0.2 mm. The width of the functional portions 34 coincides the widths W2 of the body portion 32, and the ESD resistance is adjusted (for example, increased) in accordance with the width of the functional portions 34.

Widening portions 33 are interposed between the both end portions 31 and the body portion 32. The widening portion 33 is a portion whose width gradually increases from the end portion 31 toward the body portion 32.

Figure 6:
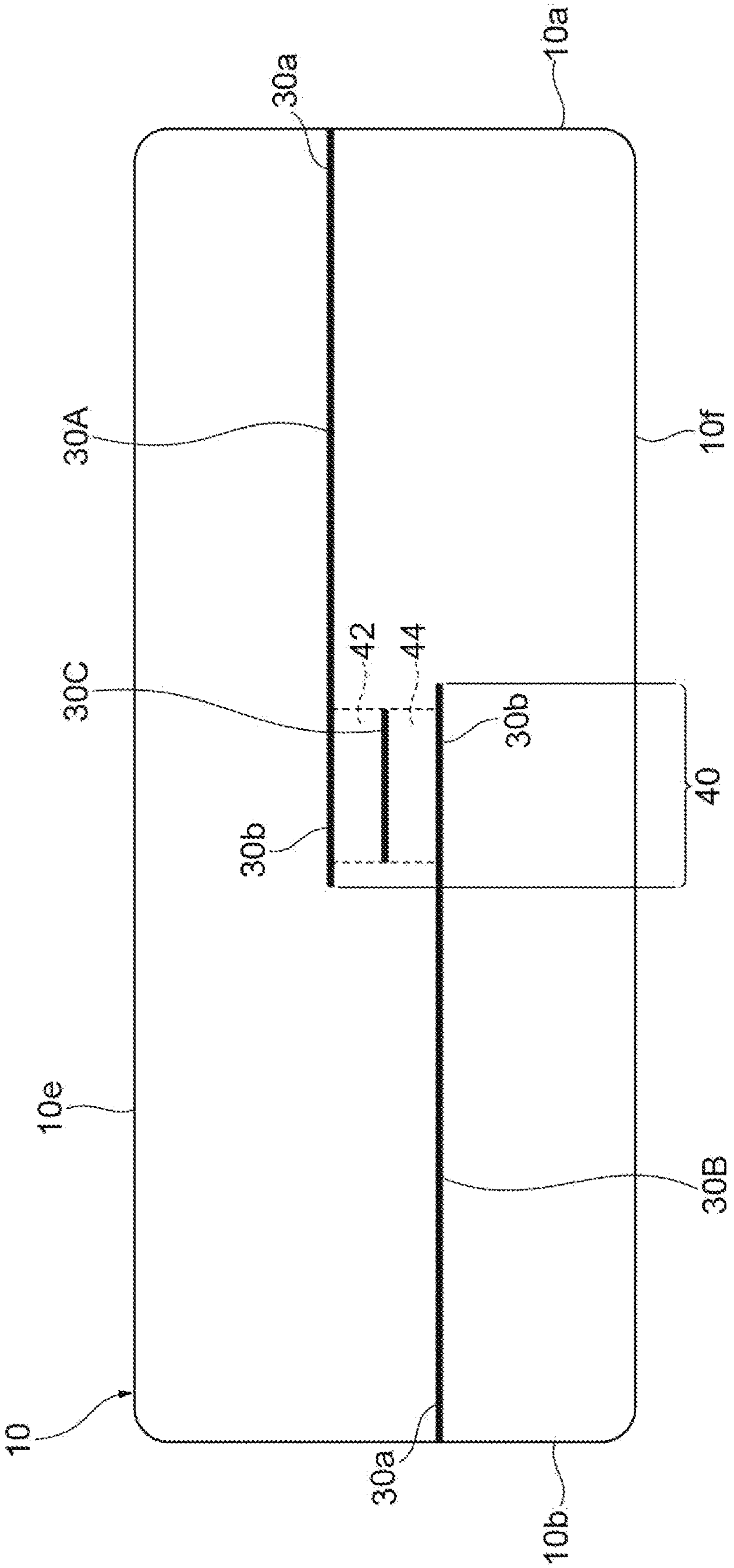
FIG. 6 is a cross-sectional view showing the positional relationship of the conductors.
Figure 7:
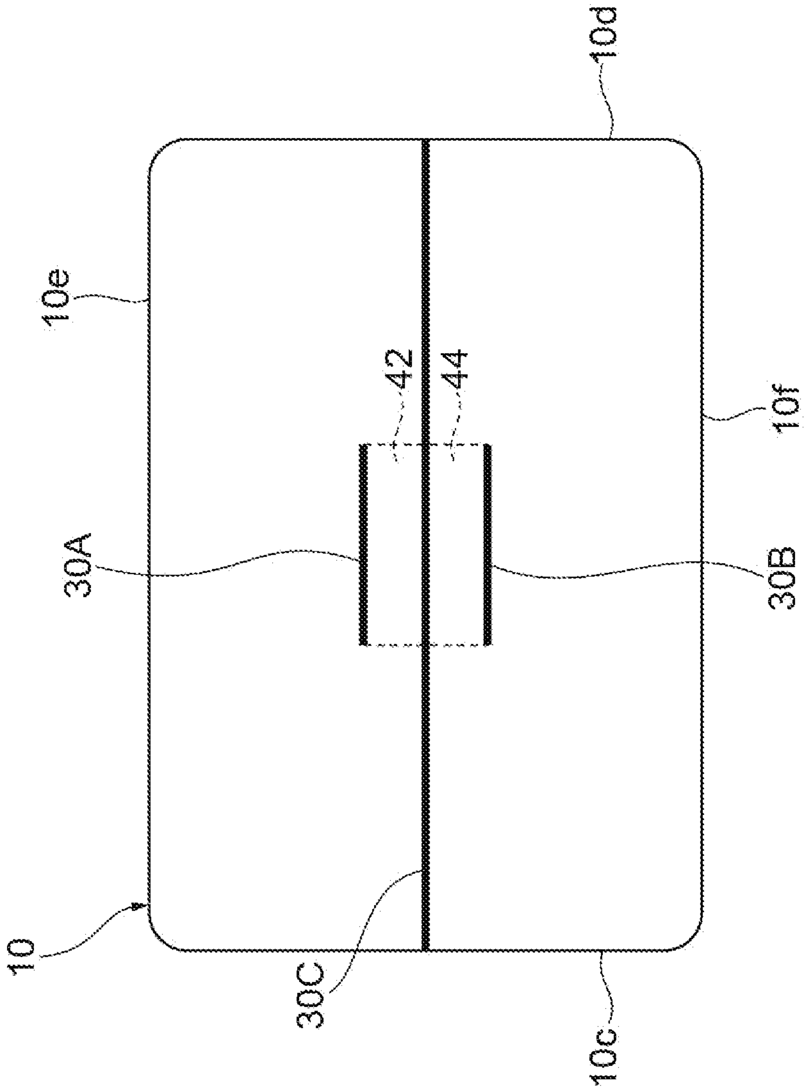
FIG. 7 is a cross-sectional view showing the positional relationship of the conductors.

As shown in FIGS. 6 and 7, the third conductor 30C extends in interlayer located between the first conductor 30A and the second conductor 30B. In the lamination direction, the distance between the third conductor 30C and the first conductor 30A is substantially the same as the distance between the third conductor 30C and the second conductor 30B. The functional portion 34 forms a first functional layer 42 between the functional portion 34 and the end portion 30*b* of the first conductor 30A. The first functional layer 42 is a part of the element body sandwiched between the functional portion 34 and the end portion 30*b* of the first conductor 30A. The first functional layer 42 has an electrostatic capacity of about 20 to 50 pF, for example. In addition, the functional portion 34 forms a second functional layer 44 between the functional portion 34 and the end portion 30*b* of the second conductor 30B. The second functional layer 44 is a part of the element body sandwiched between the functional portion 34 and the end portion 30b of the second conductor 30B. As described above, since the third conductor 30C is spaced apart from the first conductor 30A and the second conductor 30B by substantially the same distances and has substantially the same overlapping areas as those of the first conductor 30A and the second conductor 30B, the second functional layer 44 has substantially the same electrostatic capacity as that of the first functional layer 42.

The third electrodes 20C and 20D (side surface electrodes) of four terminal electrodes 20A to 20D form a pair and are disposed respectively on the side surface 10*c* side and the side surface 10*d* side of the element body 10. The third electrodes 20C and 20D are formed so as to cover both end portions 31 of the third conductor 30C exposed to the side surfaces 10*c* and 10*d* of the element body 10, respectively, and the third electrodes 20C and 20D are directly connected to the third conductor 30C. Since the pair of third electrodes 20C and 20D and the third conductor 30C are disposed symmetrically, uniform discharge can be realized. In the present embodiment, the third electrodes 20C and 20D have a substantially spindle-shaped shape as a whole.

The third electrode 20C extends in the lamination direction, wraps around the main surface 10*e* and the main surface 10*f*, and integrally covers the side surface 10*c* and the main surfaces 10*e* and 10*f*. In the present embodiment, the third electrode 20C extends in the lamination direction at an intermediate position of the long side of the side surface 10*c* having the rectangular shape and wraps around the main surface 10*e* and the main surface 10*f*. However, the third electrode 20C may be displaced from the intermediate position of the long side to some extent. More specifically, the third electrode 20C is configured to include a first portion 21 extending between ridge lines 12*k* and 12*l* between the side surface 10*e* and the main surfaces 10*e* and 10*f*, and a second portion 22 integrally extending from the first portion 21 and wrapping around each of the main surfaces 10*e* and 10*f* of the element body 10. The first portion 21 of the third electrode 20C provided on the side surface 10*c* of the element body 10 becomes the maximum width w1 at an intermediate position in the lamination direction of the element body 10, and becomes gradually narrower so that the side edge thereof is curved in a barrel shape toward the ridge lines 12*k* and 12*l* (the minimum width w2) between the side surface 10*c* and the main surface 10*e* and 10*f*. The first portion 21 of the third electrode 20C according to the present embodiment has a line-symmetric (vertically symmetric) shape with respect to the intermediate position of the side surface 10*c* in the lamination direction. Therefore, the width w2 at the ridge line 12*k* between the side surface 10*c* and the main surface 10*e* is the same as the width w2 at the ridge line 12*l* between the side surface 10*c* and the main surface 10*f*. All of the four corners of the third electrode 20C located near the ridge lines 12*k* and 12*l* are obtuse angles. The second portions 22 of the third electrode 20C provided respectively on each of the main surfaces 10*e* and 10*f* of the element body 10 is gradually narrowed such that the side edge thereof is curved in a substantially semi-circular shape since the second portion 22 is away from the ridge lines 12*k* and 12*l* between the main surfaces 10*e* and 10*f* and the side surface 10*c*.

Similarly, the third electrode 20D extends in the lamination direction, wraps around the main surfaces 10*e* and 10*f*, and integrally covers the side surface 10*d* and the main surfaces 10*e* and 10*f*. In the present embodiment, the third electrode 20D extends in the lamination direction at an intermediate position of a long side of the side surface 10*d* having a rectangular shape and wraps around the main surface 10*e* and the main surface 10*f*. However, the third electrode 20D may be displaced from the intermediate position of the long side to some extent. More specifically, the third electrode 20D is configured to include a first portion 21 extending between the ridge lines 12*i* and 12*j* between the side surface 10*d* and the main surfaces 10*e* and 10*f*, and a second portion 22 integrally extending from the first portion 21 and wrapping around each of the main surfaces 10*e* and 10*f* of the element body 10. The first portion 21 of the third electrode 20D provided on the side surface 10*d* of the element body 10 becomes the maximum width w1 at an intermediate position in the lamination direction of the element body 10, and becomes gradually narrower so that the side edge thereof is curved in a barrel shape toward the ridge line 12*i* and 12*j* (the minimum width w2) between the side surface 10*d* and the main surfaces 10*e* and 10*f*. The first portion 21 of the third electrode 20D according to the present embodiment has a line-symmetric (vertically symmetric) shape with respect to the intermediate position of the side surface 10*d* in the lamination direction. Therefore, the width w2 at the ridge line 12*i* between the side surfaces 10*d* and the main surface 10*e* is the same as the width w2 at the ridge line 12*j* between the side surface 10*d* and the main surface 10*f*. All of the four corners of the third electrode 20D located near the ridge lines 12*i* and 12*j* of the element body 10 are obtuse angles. The second portions 22 of the third electrode 20D provided respectively on each of the main surfaces 10*e* and 10*f* of the element body 10 is gradually narrowed so that the side edge thereof is curved in a substantially semi-circular shape since the second portion 22 is away from the ridge lines 12*i* and 12*j* between the main surfaces 10*e* and 10*f* and the side surface 10*d*.

That is, the widths of the first portions 21 of the third electrodes 20C and 20D are the maximum widths w1 at the intermediate positions in the lamination direction on the side surfaces 10*c* and 10*d* of the element body 10. The intermediate positions of the side surfaces 10*c* and 10*d* of the element body 10 in the lamination direction are positions where each of the end portions 31 of the third conductor 30C are exposed, and the first portions 21 of the third electrodes 20C and 20D have maximum widths w1 at the positions where each of the end portions 31 of the third conductor 30C are exposed. In addition, the widths of the first portions 21 of the third electrodes 20C and 20D are the minimum widths w2 at the ridge lines 12*i* to 12*l* between the side surfaces 10*d* and 10*e* and the main surfaces 10*e* and 10*f*.

As shown in FIG. 5, the second portions 22 of each of the third electrodes 20C and 20D overlaps at least a portion of the widening portion 33 of the third conductor 30C when viewed from the lamination direction of the element body 10. In the embodiment shown in FIG. 5, the second portion 22 of the third electrode 20C and 20D entirely overlaps the widening portion 33 of the third conductor 30C when viewed from the lamination direction of the element body 10.

The third electrodes 20C and 20D are formed by applying a conductive paste to the surfaces of the element body 10. As the conductive paste, a mixture of a glass component, an organic binder, and an organic solvent with a powder made of a metal (for example, Pd, Cu, Ag, or Ag-Pd alloy) is employed. After the conductive paste is applied to the surface of the element body 10, the binder component is removed by drying treatment or the like. The third electrodes 20C and 20D may have a single-layer structure or a multi-layer structure. For example, the surfaces of the third electrodes 20C and 20D may be formed of plating layers, and each of the third electrodes 20C and 20D may include Ni-plating layer and Sn-plating layer formed on the Ni-plating layer.

The first electrode 20A (end surface electrode) of four terminal electrodes 20A to 20D is disposed on the end surface 10*a* side of the element body 10. The first electrode 20A is formed so as to integrally cover the end surface 10*a*, and the side surfaces 10*c* and 10*d* and the main surfaces 10*e* and 10*f* of the portion close to the end surface 10*a*. The first electrode 20A is also formed so as to cover one end portion 30*a* of the first conductor 30A exposed to the end surface 10*a* of the element body 10, and the first electrode 20A is directly connected to the first conductor 30A. The second electrode 20A (end surface electrode) of four terminal electrodes 20A to 20D is disposed on the end surface 10*b* side of the element body 10. The second electrode 20B is formed so as to integrally cover the end surface 10*b*, and the side surfaces 10*c* and 10*d* and the main surfaces 10*e* and 10*f* of the portion close to the end surface 10*b*. The second electrode 20B is also formed so as to cover one end portion 30*a* of the second conductor 30B exposed to the end surface 10*b* of the element body 10, and the second electrode 20B is directly connected to the second conductor 30B.

More specifically, each of the first electrode 20A and the second electrode 20B include a first portion 23 that covers the end surfaces 10*a* and 10*b*, a second portion 24 that wraps around the side surfaces 10*c* and 10*d* of the element body 10 and covers the edges on the end surfaces 10*a* and 10*b* side, and third portion 25 that wraps around the main surfaces 10*d* and 10*f* of the element body 10 and covers the edges on the end surface 10*a* and 10*b* side. In the present embodiment, the second portion 24 covers the edge entirely of the side surface 10*c* and 10*d* on the end surface 10*a* and 10*b* side, and the third portion 25 covers the edge entirely of the main surface 10*e* and 10*f* on the end surface 10*a* and 10*b* side. The widths of the second portions 24 provided on the side surfaces 10*c* and 10*d* of the element body 10 are the maximum widths w3 at the intermediate positions in the lamination direction of the element body 10, and are the minimum widths w4 at the ridge lines 12*i* to 12*l* between the side surfaces 10*c* and 10*d* and the main surfaces 10*e* and 10*f*. The second portion 24 and the third portion 25 may have, for example, a D-shape, a semi-circular shape, or a semi-elliptical shape. The second portion 24 has a shape line-symmetrical (vertically symmetrical) with respect to the intermediate position of the side surfaces 10*c* and 10*d* in the lamination direction. Therefore, the width w4 at the ridge lines 12*i* and 12*k* between the side surfaces 10*c* and 10*d* and the main surfaces 10*e* and 10*f* and the width w4 at the edge lines 12*j* and 12*l* between the side surfaces 10*c* and 10*d* and the main surface 10*e* and 10*f* are the same. All of the corners of the second portion 24 located near the ridge lines 12*i* to 12*l* of the element body 10 and facing the third electrodes 20C and 20D are obtuse angles. The third portion 25 provided on the main surface 10*e* and the third portion 25 provided on the main surface 10*f* may have the same shape or different shapes.

Figure 8:
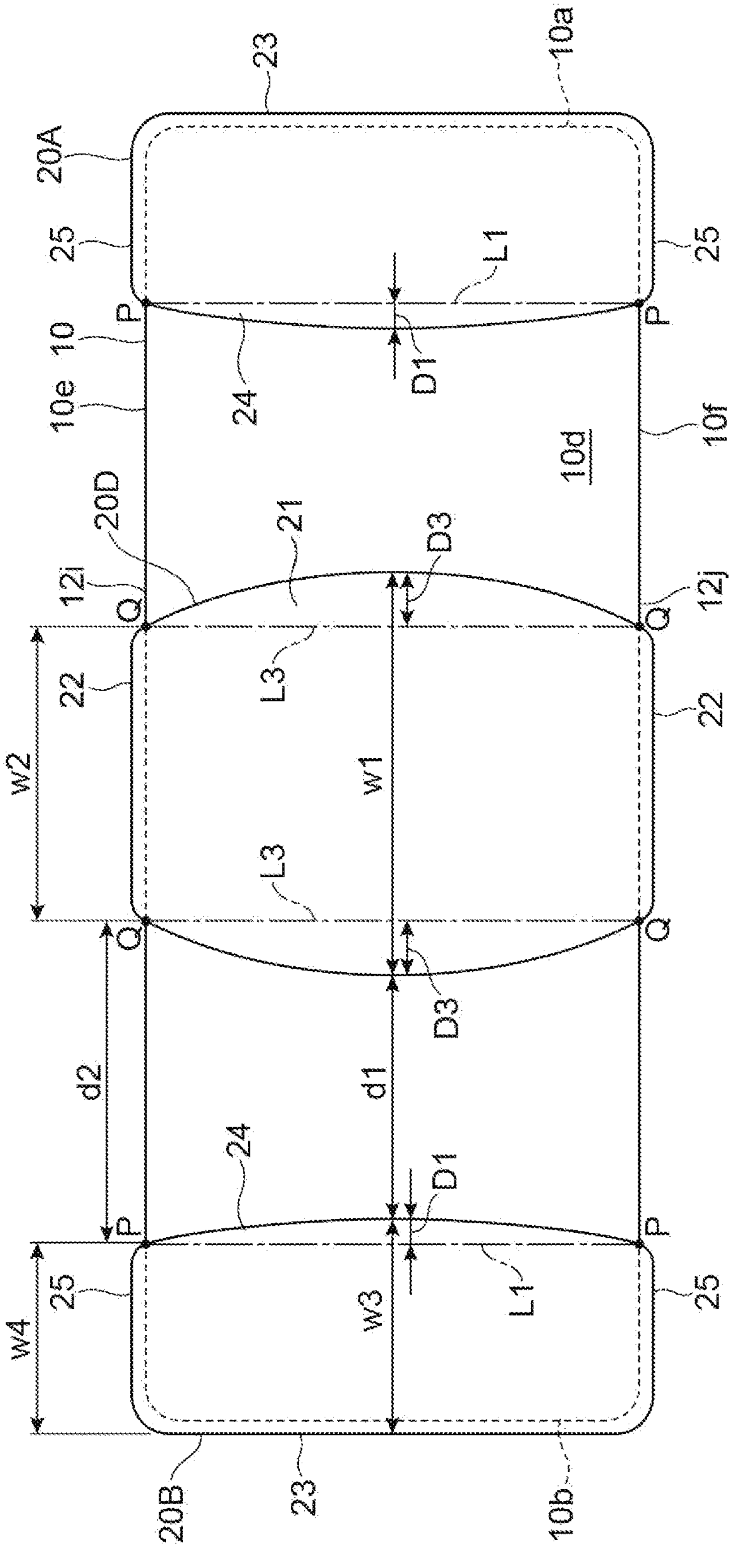
FIG. 8 is a side view showing the side surface of the element body.

Here, as shown in FIG. 8, the distances between the first portions 21 of the third electrodes 20C and 20D and the second portions 24 of the first and second electrodes 20A and 20B is the minimum distances d1 at the intermediate position of the side surfaces 10*c* and 10*d* in the lamination direction of the element body 10. In addition, the distances between the first portions 21 of the third electrodes 20C and 20D and the second portions 24 of the first and second electrodes 20A and 20B are the maximum distances d2 at the ridge lines 12*i* to 12*l* between the side surfaces 10*c* and 10*d* and the main surfaces 10*e* and 10*f*. The distances d2 at the ridge lines 12*i* to 12*l* of the element body 10 are longer than the distances d1 at the intermediate positions on the side surfaces 10*c* and 10*d* in the lamination direction. The distances between the first portions 21 of the third electrodes 20C and 20D and the second portions 24 of the first and second electrodes 20A and 20B gradually increase from the intermediate positions of the side surfaces 10*c* and 10*d* in the lamination direction toward the ridge lines 12*i* to 12*l*.

Figure 9:
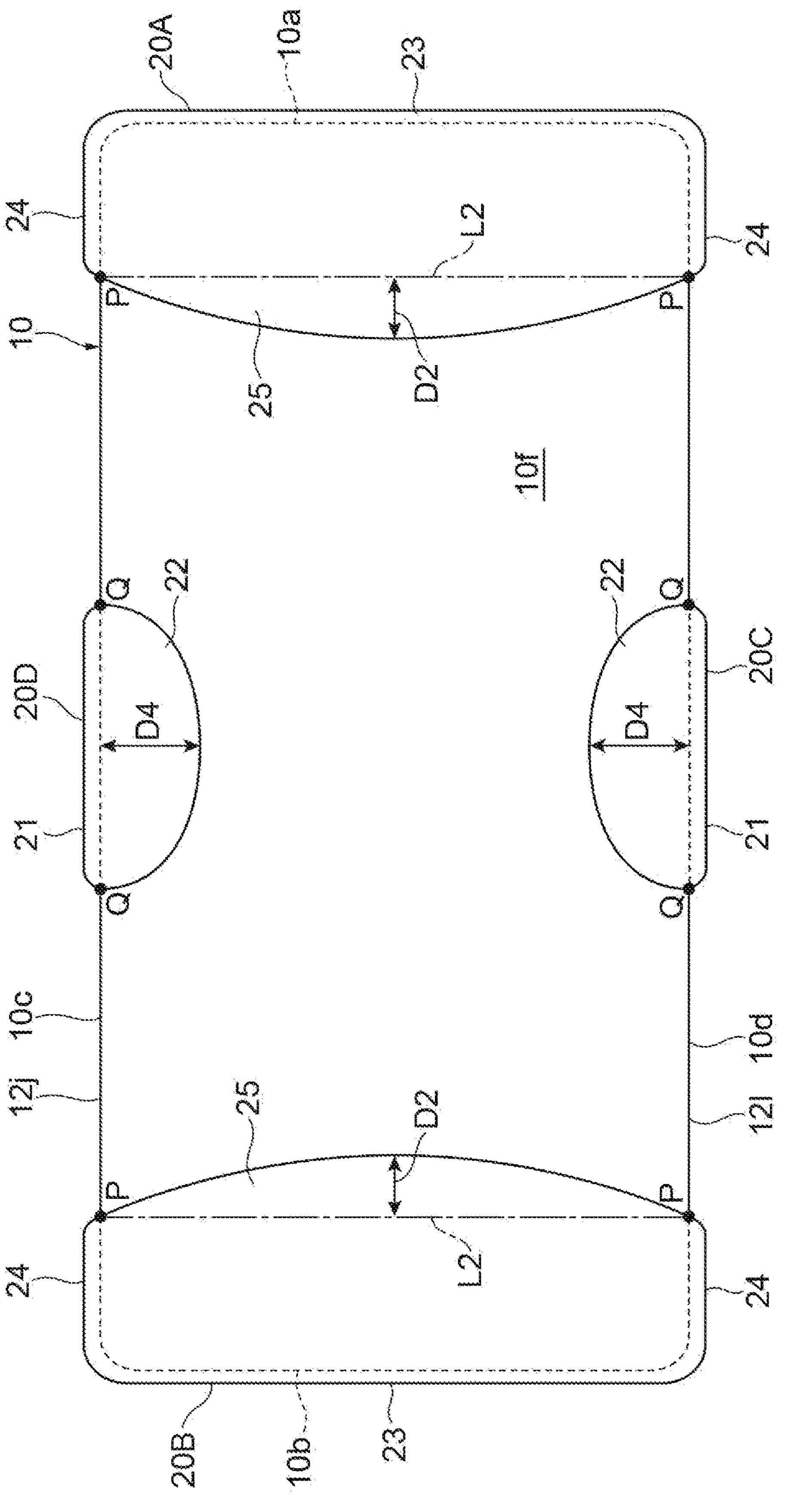
FIG. 9 is a bottom view showing the main surface of the element body.

In the first electrode 20A and the second electrode 20B, the projection lengths D2 of the third portions 25 are longer than the projection lengths D1 of the second portions 24. As shown in FIG. 8, the protruding length D1 of the second portion 24 is the maximum value of the lengths (i.e., the distances from the virtual line L1) based on the virtual line L1 connecting the tip positions P of the first and second electrode 20A and 20B on the side surfaces 10*c* and 10*d* at the ridge lines 12*i* to 12*l* defined by the main surfaces 10*e* and 10*f* and the side surfaces 10*c* and 10*d*. The protruding lengths D1 of the first electrodes 20A and the protruding lengths D1 of the second electrodes 20B may be the same or different. As shown in FIG. 9, the protruding length D2 of the third portion 25 is the maximum value of the lengths (i.e., the distances from the virtual line L2) based on the virtual line L2 connecting the tip positions P of the first and second electrodes 20A and 20B at the ridge lines 12*i* to 12*l* defined by the main surface 10*e* and 10*f* and the side surfaces 10*c* and 10*d*. The protruding lengths D2 of the first electrodes 20A and the protruding lengths D2 of the second electrodes 20B may be the same or different. The virtual lines L1 and L2 according to the present embodiment extend in parallel with the end surfaces 10*a* and 10*b*, but may be inclined at a predetermined angle with respect to the end surfaces 10*a* and 10*b*.

The first electrode 20A and the second electrode 20B are sintered electrodes, for example, and are formed by applying a conductive paste to the surfaces of the element body 10 and sintering the conductive paste. As the conductive paste, a mixture of a glass component, an organic binder, and an organic solvent with a powder made of a metal (for example, Pd, Cu, Ag, or Ag-Pd alloy) is employed. A plating layer may be formed on such a sintered electrode. The plating layer may include a Ni plating layer and a Sn plating layer formed on the Ni plating layer. The first electrode 20A and the second electrode 20B may have a single-layer structure or a multi-layer structure.

When the conductive paste is applied to the surfaces of the element body 10 in forming the first electrode 20A and the second electrode 20B, the side surfaces 10*c* and 10*d* on which the second portions 24 are formed are brought into a surface state having low affinity for the conductive paste (hydrophobic surfaces). Thus, the wettability of the conductive paste on the side surfaces 10*c* and 10*d* is reduced, and the protrusion lengths D1 of the second portions 24 can be shortened. The hydrophobic surface can be realized by applying a resin to the surfaces of the element body, as an example, can be realized by bringing a resin film into contact with the surfaces of the element body. In the present embodiment, when the conductive paste to be the first electrode 20A and the second electrode 20B is applied to the surfaces of the element body 10, a resin is selectively provided only on the side surfaces 10*c* and 10*d*. Thus, the side surfaces 10*c* and 10*d* become hydrophobic surfaces, and the end surfaces 10*a* and 10*b* and the main surfaces 10*e* and 10*f* are surface states having relatively high affinity for the conductive paste (hydrophilic surfaces). At this time, due to the wettability of the conductive paste, the angle of the tip of the third portion 25 in the cross section orthogonal to the main surfaces 10*e* and 10*f* becomes narrower than the angle of the tip of the second portion 24 in the cross section orthogonal to the side surfaces 10*c* and 10*d*.

The projection lengths D3 of the first portions 21 of the third electrodes 20C and 20D are longer than the projection lengths D1 of the second portions 24 of the first and second electrodes 20A and 20B. As shown in FIG. 8, the projection length D3 of the first portion 21 is the maximum value of the lengths (i.e., distances from the virtual line L3) based on the virtual line L3 connecting the end positions Q of the third electrode 20C and 20D on the side surfaces 10*c* and 10*d* at the ridge lines 12*i* to 12*l* defined by the side surfaces 10*c* and 10*d* and the main surfaces 10*e* and 10*f*. The protrusion length D3 on the first electrode 20A side and the protrusion length D3 on the second electrode 20B side may be the same or different. The projection lengths D3 of the third electrodes 20C provided on the side surfaces 10*c* and the projection length D3 of the third electrodes 20D provided on the side surfaces 10*d* may be the same or different. By making the protruding lengths D3 of the third electrodes 20C and 20D equal to each other, high dimensional accuracy can be realized, and variations in characteristics between the third electrodes 20C and 20D can be suppressed. In a case where the projection length D3 of one of the third electrodes 20C and 20D are set to be longer than the projection length D3 of the other, it is possible to improve mountability by mounting, as mounting surfaces, the side surfaces 10*c* and 10*d* on which the third electrodes 20C and 20D having the longer projection lengths D3 are provided. When the conductive paste is applied to the surfaces of the element body 10 in forming the terminal electrodes 20A to 20D, each of the side surfaces 10*c* and 10*d* has a hydrophilic part in the areas where the first portions 21 are formed, and a hydrophobic part in the areas where the first and second electrode 20A and 20B are formed. Thus, the wettability of the conductive paste on of the side surfaces 10*c* and 10*d* to be the first and second electrode 20A and 20B is reduced, and the protruding length D1 of the second portion 24 can be made relatively short (conversely, the protruding length D3 of the first portion 21 can be made relatively long). At this time, due to the wettability of the conductive paste, the angle of the tip of the first portion 21 of each of the third electrodes 20C and 20D in the cross section orthogonal to the side surfaces 10*c* and 10*d* is narrower than the angle of the tip of the second portion 24 of each of the first and second electrodes 20A and 20B in the cross section orthogonal to the side surfaces 10*c* and 10*d*.

The projection lengths D4 of the second portions 22 of the third electrodes 20C and 20D are longer than the projection lengths D2 of the third portions 25 of the first and second electrodes 20A and 20B. As shown in FIG. 9, the projection lengths D4 of the second portions 22 are the maximum values of the projection lengths of the portions 22 on the main surfaces 10*c* and 10*f* based on the ridge lines 12*i* to 12*l* defined by the side surface 10*c* and 10*d* and the main surfaces 10*e* and 10*f*. The protruding length D4 of the third electrode 20C and the protruding length D4 of the third electrode 20D may be the same or different.

When the conductive paste is applied to the surfaces of the element body 10 in forming the third electrodes 20C and 20D, the main surfaces 10*e* and 10*f* are brought into a surface state having a relatively high affinity for the conductive paste (hydrophobic surface). This ensures sufficient wettability of the conductive paste on the main surfaces 10*e* and 10*f* and increases the protrusion lengths D4 of the second portions 22. At this time, due to the wettability of the conductive paste, the angle of the tip of the second portions 22 in the cross section orthogonal to the main surfaces 10*e* and 10*f* becomes narrower than the angle of the tip of the second portion 24 in the cross section orthogonal to the side surfaces 10*c* and 10*d*.

As described above, in the chip varistor 1, the projection lengths D1 of the second portions 24 of the first and second electrode 20A and 20B are shorter than the projection lengths D3 of the first portions 21 of the third electrodes 20C and 20D. Since the protruding lengths D1 of the second portions 24 are relatively short, the distances between the first electrodes 20A and the second electrodes 20B in the side surface 10*c* and 10*d* are secured, thereby suppressing short-circuiting or the like. On the other hand, by making the projection lengths D3 of the first portions 21 of the third electrodes 20C and 20D relatively long, the first portions 21 become wide, the covering properties of each of the end portions 31 of the third conductor 30C exposed in the side surfaces 10*c* and 10*d* provided with the third electrodes 20C and 20D are enhanced, and the connectivity between the third conductor 30C and the third electrodes 20C and 20D is improved.

In the chip varistor 1, the projection lengths D2 of the third portions 25 of the first and second electrodes 20A and are longer than the projection lengths D1 of the second portions 24. Since the projection lengths D2 of the third portion 25 positioned on the main surface 10*f* constituting the mounting surface is relatively long, for example, when the chip varistor 1 is mounted by soldering, a solder formation region on the mounting surface becomes wide, and the mountability is enhanced. For example, a sufficient amount of solder can be applied to the first and second electrodes 20A and 20B, thereby improving the bonding strength. On the other hand, since the protruding lengths D1 of the second portions 24 located on the side surfaces 10*c* and 10*d* which do not constitute the mounting surface are relatively short, the distances between the first electrodes 20A and the second electrodes 20B are secured, and thus short-circuiting between the first and second electrodes 20A and 20B or the like is suppressed.

In addition, in the chip varistor 1, electric field concentration may occur at corners between the terminal electrodes 20A to 20D when the chip varistor 1 is driven. However, in the chip varistor 1, the distances between the third electrodes 20C and 20D and the first and second electrodes 20A and 20B are designed to be long on the side surfaces 10*c* and 10*d*, and the distances between the first portion 21 of the third electrodes 20C and 20D and the second portion 24 of the first and second electrodes 20A and 20B are maximum at the edge lines 12*i* to 12*l* of the element body 10. Thereby, deterioration of each of the terminal electrodes 20A to 20D caused by electric field concentration is suppressed.

Furthermore, since the terminal electrodes 20A to 20D are narrow (that is, the minimum widths w2 and w4) at the ridge lines 12*i* to 12*l* of the side surfaces 10*c* and 10*d* of the element body 10, and the corners thereof are obtuse angles, electric field concentration at the corners is suppressed in each of the terminal electrodes 20A to. 20D.

The widths W3 of the third electrodes 20C and 20D are designed to be wider than the widths W1 of the end portion 31 of the third conductor 30C (W3>W1). The widths W3 of the third electrodes 20C and 20D are designed to be wider than the widths W2 of the body portion 32 of the third conductor 30C (W3>W2). The widths W3 of the third electrodes 20C and 20D are, for example, 0.5 mm. In the present embodiment, the width W3 of the third electrodes 20C are equal to the width W3 of the third electrodes 20D. The width W3 of the third electrodes 20C may be different from the width W3 of the third electrodes 20D.

In the chip varistor 1, the ESD resistance is increased by widening the width W2 of the functional portion 34 of the third conductor 30C. The widths W1 of the end portions 31 of the third conductor 30C is shorter than the widths W3 of the third electrodes 20C and 20D (W3>W1) and is shorter than the width W2 of the functional portion 34 of the third conductor 30C (W2>W1). Therefore, for example, when forming the third electrodes 20C and 20D, even if there is a relative positional deviation between the third electrodes 20C and 20D and the third conductor 30C with respect to the facing direction of the end surfaces 10*a* and 10*b*, a situation in which a portion of the third conductor 30C is not covered by the third electrodes 20C and 20D is unlikely to occur. That is, even if a relative positional deviation occurs between the third conductor 30C and the third electrodes 20C and 20D, the size of the connection region between the third conductor 30C and the third electrodes 20C and 20D does not change, and favorable connection can be realized.

When the widths W1 of the end portions 31 of the third conductor 30C are greater than or equal to the widths W3 of the third electrodes 20C and 20D (W3≤W1), if there is a relative positional deviation between the third electrodes 20C and 20D and the third conductor 30C in the facing direction of the end surfaces 10*a* and 10*b*, a part of the third conductors 30C may not be covered by the third electrodes 20C and 20D and the end portions 31 of the third conductor 30C may be exposed from the third electrodes 20C and 20D. If the end portions 31 of the third conductor 30C are exposed from the third electrodes 20C and 20D, a product defect may occur. Alternatively, the size of the connection region between the third conductor 30C and the third electrodes 20C and 20D varies from product to product, and characteristic deviation may occur from product to product.

In the chip varistor 1, as shown in FIG. 5, the widths W3 of the third electrodes 20C and 20D are larger than the width W2 of the body portion 32 of the third conductor 30C (W3>W2). In this case, by making the third electrodes 20C and 20D wide, even when the above-described relative positional deviation is large, it is possible to realize good connection between the third conductor 30C and the third electrodes 20C and 20D.

Further, in the above-described chip varistor 1, since the third conductor 30C has the widening portion 33, even when the widths of the end portion 31 and the body portion 32 are different from each other, the concentration of stresses at the boundary between the end portion 31 and the body portion 32 is suppressed, and the occurrence of defects such as cracks is suppressed.

Furthermore, since the second portions 22 of the third electrodes 20C and 20D extend long from the ridge lines 12*i* to 12*l* of the element body 10 to such an extent as to overlap at least a part of the widening portion 33 of the third conductor 30C when viewed from the lamination direction of the element body 10, heat generated in the element body 10 (for example, the third conductor 30C) can be efficiently released to the outside from the second portions 22 of the third electrodes 20C and 20D. Heat generated in the element body 10 may be directly transmitted to the second portion 22 through the inside of the element body 10 or may be indirectly transmitted to the second portion 22 via the first portion 21.

The present disclosure is not necessarily limited to the above-described embodiment, and various modifications can be made without departing from the scope of the present disclosure. For example, the electronic component is not limited to a chip varistor in which a varistor structure is formed inside an element body, and may be a capacitor or the like in which a capacitor structure is formed inside an element body. In addition, the number of third electrodes may be one, and the third electrode may be provided on any one of the pair of side surfaces in this case. Furthermore, the third electrode may integrally cover both the side surface and the pair of main surfaces, or may integrally cover the side surface and one of the pair of main surfaces.

What is claimed is:

1. An electronic component comprising:

an element body including a pair of main surfaces parallel to each other and one of the pair of main surfaces constitutes a mounting surface, a pair of end surfaces parallel to each other and extending in a direction intersecting the main surfaces, and a pair of side surfaces parallel to each other and extending in a direction intersecting the main surfaces and the end surfaces;

a side surface exposed electrode provided in the element body and having an end portion exposed at the side surface, the end portion extending in parallel to the main surface at the side surface;

a pair of end surface electrodes respectively provided on the pair of end surfaces, each of the end surface electrodes integrally covering the end surface, the side surface and the main surface of portions close to the end surface, and each of the end surface electrodes having a first portion covering the end surface, a second portion covering the side surface, and a third portion covering the main surface; and a side surface electrode provided on the side surface, integrally covering the side surface and the main surface of a portion close to the side surface, the side surface electrode having a first portion covering the side surface and connected to the end portion of the side surface exposed electrode exposed at the side surface, and a second portion covering the main surface, wherein a protruding length of the second portion of the end surface electrode based on a virtual line connecting tip positions of the end surface electrode on ridge lines defined by the main surfaces and the side surface of the element body is shorter than a protruding length of the first portion of the side surface electrode based on a virtual line connecting end positions of the side surface electrode on the ridge lines.

2. The electronic component according to claim 1, wherein an angle of a tip of the side surface electrode in a cross section orthogonal to the side surface is narrower than an angle of a tip of the second portion of the end surface electrode in the cross section orthogonal to the side surface.

3. The electronic component according to claim 1, wherein a protruding length of a portion of the side surface electrode covering the main surface based on ridge lines defined by the main surfaces and the side surface of the element body is longer than a protruding length of the side surface electrode based on a virtual line connecting end positions of the side surface electrode on the ridge lines.

4. The electronic component according to claim 1, wherein a projection length of the third portion based on a virtual line connecting tip positions of the end surface electrode on ridge lines defined by the main surface and the side surfaces of the element body is longer than a projection length of a portion covering the main surface of the side surface electrode based on the ridge line.

5. A tip varistor is the electronic component according to claim 1, wherein a varistor structure is formed inside the element body.

* * * * *